(12) United States Patent
Lee et al.

(10) Patent No.: US 10,505,241 B2
(45) Date of Patent: Dec. 10, 2019

(54) METAL-AIR BATTERY

(71) Applicant: Samsung Electronics Co., Ltd., Suwon-si, Gyeonggi-do (KR)

(72) Inventors: Hyunchul Lee, Hwaseong-si (KR); Hyukjae Kwon, Suwon-si (KR); Sangbok Ma, Suwon-si (KR); Taeyoung Kim, Seoul (KR); Dongjoon Lee, Yongin-si (KR); Heungchan Lee, Seongnam-si (KR); Dongmin Im, Seoul (KR); Wonsung Choi, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 900 days.

(21) Appl. No.: 14/712,181

(22) Filed: May 14, 2015

(65) Prior Publication Data

US 2015/0333384 A1 Nov. 19, 2015

(30) Foreign Application Priority Data

May 16, 2014 (KR) .................. 10-2014-0059304

(51) Int. Cl.
| | |
|---|---|
| *H01M 12/02* | (2006.01) |
| *H01M 12/08* | (2006.01) |
| *H01M 8/2465* | (2016.01) |
| *H01M 8/248* | (2016.01) |
| *H01M 10/04* | (2006.01) |
| *H01M 10/052* | (2010.01) |
| *H01M 12/06* | (2006.01) |
| *H01M 8/2435* | (2016.01) |
| *H01M 10/0562* | (2010.01) |
| *H01M 10/0565* | (2010.01) |

(52) U.S. Cl.
CPC ........... *H01M 12/08* (2013.01); *H01M 8/248* (2013.01); *H01M 8/2465* (2013.01); *H01M 10/0468* (2013.01); *H01M 10/052* (2013.01); *H01M 12/02* (2013.01); *H01M 12/06* (2013.01); *H01M 8/2435* (2013.01); *H01M 10/0422* (2013.01); *H01M 10/0562* (2013.01); *H01M 10/0565* (2013.01); *Y02E 60/128* (2013.01)

(58) Field of Classification Search
CPC .. H01M 8/004; H01M 8/0252; H01M 8/2345; H01M 8/243; H01M 12/06; H01M 12/08; H01M 4/765; H01M 4/767
See application file for complete search history.

(56) References Cited

U.S. PATENT DOCUMENTS

| | | | |
|---|---|---|---|
| 6,551,735 | B2 | 4/2003 | Badding et al. |
| 7,282,295 | B2 | 10/2007 | Visco et al. |
| 7,691,536 | B2 | 4/2010 | Johnson |

(Continued)

FOREIGN PATENT DOCUMENTS

| | | |
|---|---|---|
| JP | 2005-322452 A | 11/2005 |
| JP | 2008-169104 A | 7/2008 |
| KR | 101156853 B1 | 6/2012 |

*Primary Examiner* — Stephan J Essex
(74) *Attorney, Agent, or Firm* — Cantor Colburn LLP

(57) ABSTRACT

A metal-air battery includes a monolithic body including at least one channel; and at least one cell disposed between the channel and the body, the cell including a negative electrode including a metal, a positive electrode disposed apart from the negative electrode and configured to use oxygen as an active material, and an electrolyte disposed between the negative electrode and the positive electrode.

22 Claims, 6 Drawing Sheets

(56) References Cited

U.S. PATENT DOCUMENTS

| | | |
|---|---|---|
| 7,767,345 B2 | 8/2010 | Imagawa et al. |
| 2007/0051620 A1* | 3/2007 | Visco ............... H01M 4/02 204/280 |
| 2007/0166589 A1* | 7/2007 | Nakanishi ............ H01M 8/004 429/483 |
| 2007/0231704 A1 | 10/2007 | Inda |
| 2008/0070087 A1 | 3/2008 | Johnson |
| 2011/0059355 A1 | 3/2011 | Zhang et al. |
| 2011/0129739 A1 | 6/2011 | Nakanishi |
| 2011/0223494 A1 | 9/2011 | Feaver et al. |
| 2011/0236798 A1* | 9/2011 | Burchardt ........... H01M 4/8835 429/517 |
| 2012/0064432 A1* | 3/2012 | Lee ................... H01M 8/1226 429/481 |
| 2012/0077084 A1 | 3/2012 | Christensen et al. |
| 2012/0077095 A1 | 3/2012 | Roumi et al. |
| 2012/0115048 A1 | 5/2012 | Roev et al. |
| 2012/0141889 A1 | 6/2012 | Lee et al. |
| 2012/0208095 A1* | 8/2012 | Hucker .............. H01M 4/8626 429/405 |
| 2012/0276459 A1 | 11/2012 | Im et al. |
| 2013/0108934 A1 | 5/2013 | Lee et al. |
| 2013/0224609 A1 | 8/2013 | Lee et al. |
| 2013/0244085 A1 | 9/2013 | Coors et al. |
| 2013/0330639 A1 | 12/2013 | Lee et al. |
| 2014/0011101 A1 | 1/2014 | Ma et al. |
| 2015/0079485 A1 | 3/2015 | Choi et al. |
| 2015/0140452 A1 | 5/2015 | Park et al. |
| 2018/0198134 A1 | 7/2018 | Roev et al. |

\* cited by examiner

METAL-AIR BATTERY

RELATED APPLICATION

This application claims priority to and the benefit of Korean Patent Application No. 10-2014-0059304, filed on May 16, 2014, in the Korean Intellectual Property Office, and all the benefits accruing therefrom under 35 U.S.C. § 119, the content of which is incorporated herein in its entirety by reference.

BACKGROUND

1. Field

The present disclosure relates to a metal-air battery.

2. Description of the Related Art

A metal-air battery includes a negative electrode for intercalation/deintercalation of ions and a positive electrode using oxygen from the air as an active material. When the metal-air battery operates, a reduction/oxidation reaction of oxygen that flows in the battery from the outside occurs in the positive electrode and an oxidation/reduction reaction of a metal occurs in the negative electrode. Chemical energy is generated, which is output as electrical energy. For example, the metal-air battery may absorb oxygen during a discharge operation and emit oxygen during a charge operation. Since the metal-air battery uses oxygen from the atmosphere, an energy density of the battery may be substantially increased. For example, the metal-air battery may have an energy density many times greater than that of a lithium ion battery.

Also, the metal-air battery has excellent stability due to a low possibility of ignition at high temperature. In addition, environmental pollution caused by the metal-air battery is low since such a battery does not use a heavy metal and operates based on the intercalation/deintercalation of oxygen. Nonetheless, despite to various advantages of the metal-air battery, there remains a need for batteries having further improved performance.

SUMMARY

Provided is a metal-air battery having a honeycomb structure that facilitates air supply and improves the energy density of the metal-air battery.

Additional aspects will be set forth in part in the description which follows and, in part, will be apparent from the description.

According to an aspect, a metal-air battery includes a monolithic body including at least one channel; and at least one cell disposed between the channel and the body, the cell including a negative electrode including a metal, a positive electrode disposed apart from the negative electrode and configured to use oxygen as an active material, and an electrolyte disposed between the negative electrode and the positive electrode.

The cell is disposed between the channel and the body.

The channel may pass through the body and may be disposed in a direction parallel to a length direction of the body.

The positive electrode may be exposed to the channel.

The negative electrode may bind to the body.

At least one of the negative electrode, the positive electrode, and the electrolyte may be symmetrical with respect to a central axis of the channel.

The negative electrode may include at least one selected from lithium metal, a lithium metal-based alloy, and a lithium intercalation compound.

The cell may further include at least one selected from a protection film that is disposed between the negative electrode and the electrolyte and which inhibits oxygen permeation towards the negative electrode; and an interlayer that is disposed between the negative electrode and the electrolyte and which facilitates the movement of metal ions.

The cell may further include a gas diffusion layer that is disposed on the positive electrode and which facilitates supply of oxygen to the positive electrode.

An external surface of the body may be carbon-coated.

A pressing unit that applies a pressure in a direction from the channel to the body may be further included.

The pressing unit may be disposed in the channel.

A shape of the pressing unit may change according to a voltage applied thereto.

The pressing unit may expand in a direction from a central axis of the channel to the body when a voltage is applied thereto and may be disposed apart from the cell when no voltage is applied thereto.

The pressing unit may include an elastic member which has a shape according to a voltage applied thereto; and a pair of electrodes that are disposed apart from each other with the elastic member disposed therebetween and that apply the voltage to the elastic member.

The pressing unit may include an elastic member having a shape which changes according to inflow of a fluid; and a fluid controller providing the fluid into the elastic member.

The elastic member may have a hollow fiber shape.

An end of the elastic member may be connected to the fluid controller and an opposite end of the elastic member may be closed.

The pressing unit may have a spring shape.

The pressing unit may have a hollow fiber shape having an empty interior, may bind to the cell, and may include a side having holes formed therein.

At least a portion of the pressing unit may include a conductive material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
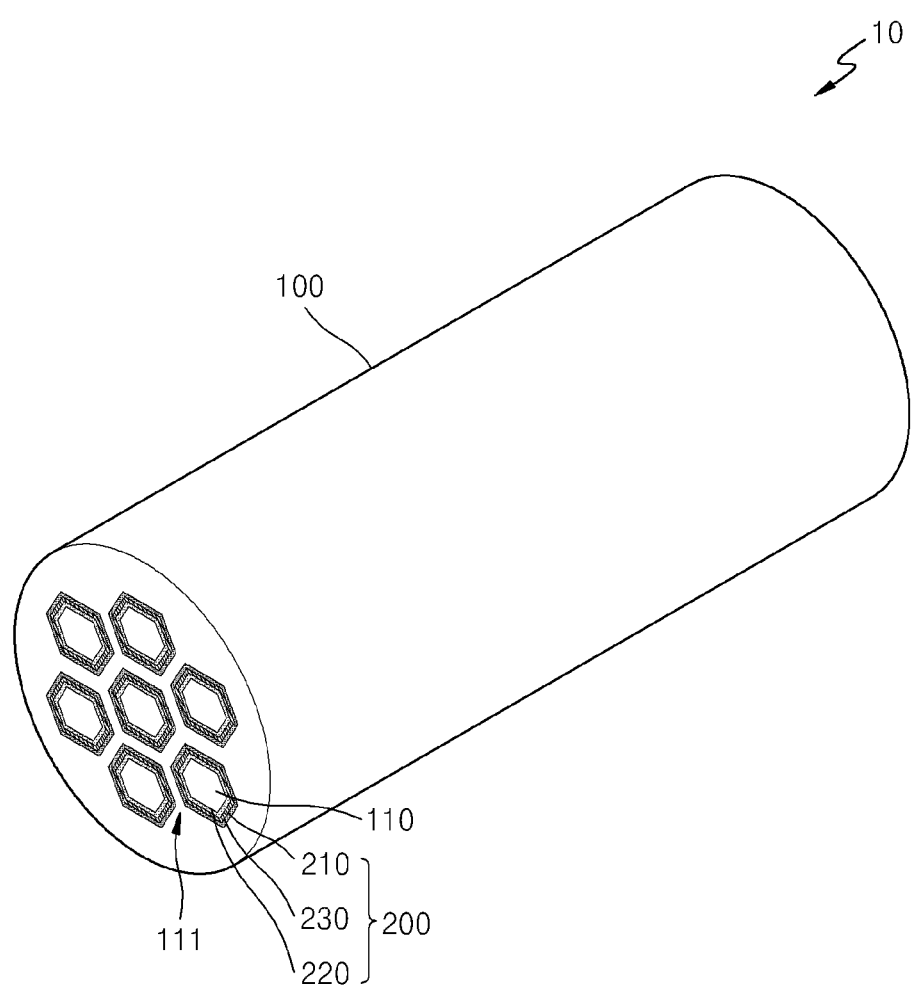
FIG. 1 shows a structure of an embodiment of a metal-air battery having a honeycomb structure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a metal-air battery having a honeycomb structure is disclosed in further detail with reference to the drawings that are schematic illustrations of idealized embodiments. As such, variations from the shapes of the illustrations as a result, for example, of manufacturing techniques and/or tolerances, are to be expected. Also, sizes of components in the drawings may be enlarged for clarity and convenience of description. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The "lanthanide elements" means the chemical elements with atomic numbers 57 to 71.

"Actinide" means the chemical elements with atomic numbers 89 to 103.

"Monolithic" means formed of a single material, such as is provided by extrusion.

A metal-air battery according to an embodiment may be used as a metal primary battery or as a metal secondary battery. Also, the term 'air' as used herein is not limited to atmospheric air and may include any suitable combination of gases, including oxygen and pure oxygen gas. The broad definition of the term "air" is applicable to air batteries and air cathodes.

FIG. 1 shows a structure of an embodiment of a metal-air battery 10 having a honeycomb structure. Referring to FIG. 1, the metal-air battery 10 may include a monolithic body 100, e.g., a body having a honeycomb structure, which includes at least one channel 110, and at least one cell 200. The cell 200 is disposed between the channel 110 and the body 100.

The body 100 supports the cell 200 and forms an external shape of the metal-air battery 10. The body 100 may comprise a material that may absorb or reduce a volumetric change of the cell 200 during charging or discharging of the cell 200. For example, the body 100 may comprise a ceramic or a metal. Representative ceramics include at least one selected from a boride, carbide, nitride, oxide, and a silicate of at least one selected from Al, Si, Sc, Y, a lanthanide element, an actinide element, Ti, Zr, Hf, V. Nb, and Ta. Alumina and zirconia are specifically mentioned. The ceramic may further comprise a stabilizing agent, such as magnesium oxide and/or yttrium oxide. Representative metals include at least one selected from aluminum, zinc, iron, magnesium, titanium, nickel, and an alloy thereof. In FIG. 1, the body 100 is shown to have a cylindrical shape, but the shape thereof is not limited thereto. The body 100 may have any suitable shape, such as a polygonal pillar shape or an oval pillar shape. The body 100 may be formed by any suitable methods, such as extrusion or molding. Also, the body 100 may be coated with an acid resistant metal, an oxide, or an alloy film for preventing oxidation. For example, a surface of the body 100 may have a carbon layer thereon to prevent exposure of the body to oxygen. Alternatively, an alumina layer may be provided on the surface of the body 100. The alumina layer may be provided by anodizing, for example.

As shown in FIG. 1, each cell is disposed on an inner surface of the body 100 such that negative electrodes of adjacent cells are separated by a wall 111 of the body 100.

Figure 2A:
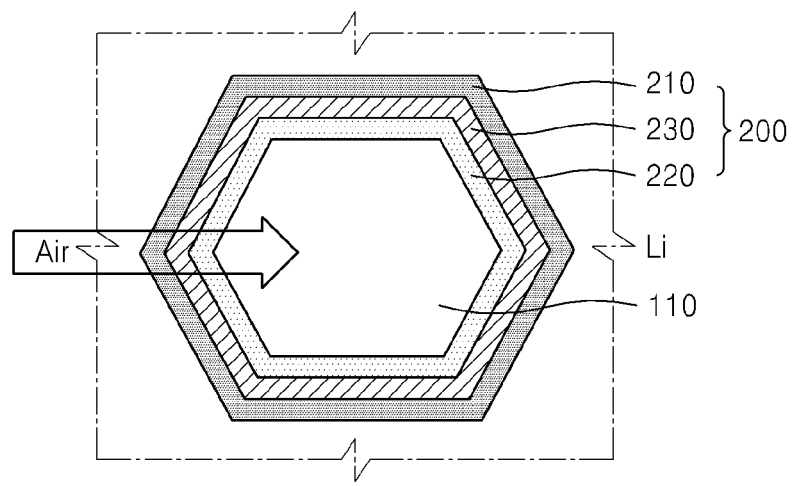
FIG. 2A shows an embodiment of a cell of the metal-air battery shown in FIG. 1.

As shown in FIG. 2A, the channel 110 passing through the body 100 is disposed in the body 100. The channel 110 may be formed in parallel to a length direction of the body 100. A cross-section of the channel 110 may have various shapes such as a circular shape, an oval shape, or a polygonal shape. A hexagonal cross-section is specifically mentioned. The body 100 may comprise a plurality of channels 110, wherein sizes of the channels may be the same as or different from each other. Also, each of the plurality of the cells 200 may be disposed between the each of the channel 110 and the body 100.

As shown in FIG. 2A, the cell 200 may include a negative electrode 210 for intercalation or deintercalation, e.g., alloying and dealloying, of metal ions, a positive electrode 220 that is disposed apart from the negative electrode 210 and which is configured to use oxygen as an active material, and a electrolyte 230 disposed between the negative electrode 210 and the positive electrode 220 and including a metal ion conductive medium.

The negative electrode 210, the electrolyte 230, and the positive electrode 220 may be sequentially disposed towards the central axis of a channel 110 in the body 100. For example, the negative electrode 210, the electrolyte 230, and the positive electrode 220 may be coated and sequentially disposed in the body 100. The negative electrode 210, the electrolyte 230, and the positive electrode 220 may be formed by any suitable method, including coating. The negative electrode 210 may bind to the body 100, e.g., may be disposed on an inner surface 110 of the body, and the positive electrode 220 may be exposed to the channels 110 so that it is in fluid communication with air. Exposure of the negative electrode 210 to oxygen may be decreased because the negative electrode 210 is surrounded by the body 100 and the electrolyte 230. Accordingly, stability of the negative electrode 210 may be increased. Also, air supply to the positive electrode 220 may be facilitated because the positive electrode 220 is exposed externally, e.g., is in fluid communication with outside air via the channel 110.

Furthermore, the negative electrode 210, the electrolyte 230, and the positive electrode 220 may be symmetrically disposed with respect to the central axis of the channel 110. In an embodiment, the negative electrode 210, the electrolyte 230, and the positive electrode 220 each have rotational symmetry with respect to the central axis of the channel 110. The symmetry may be $C_n$ symmetry, wherein n is 3 to 6, for example 6. The negative electrode 210, the electrolyte 230, and the positive electrode 220 may each have reflection symmetry. In an embodiment, the negative electrode 210, the electrolyte 230, and the positive electrode 220 each have hexagonal symmetry. A combination of the negative electrode 210, the electrolyte 230, and the positive electrode 220 may have rotational and/or reflection symmetry. In an embodiment, the combination of the negative electrode 210, the electrolyte 230, and the positive electrode 220 has hexagonal symmetry. As such, the positive electrode 220 may be uniformly exposed to oxygen and the cell 200 may be uniformly charged or discharged in an entire area thereof.

The negative electrode 210 may include a metal and may intercalate and deintercalate, e.g., alloy and dealloy, metal ions. For example, the negative electrode 210 may include at least one selected from lithium (Li), sodium (Na), zinc (Zn), potassium (K), calcium (Ca), magnesium (Mg), iron (Fe), aluminum (Al), and an alloy thereof. More particularly, when the negative electrode 210 is configured to intercalate or deintercalate lithium, the negative electrode 210 may include at least one selected from Li metal, a Li metal-based alloy, and a material capable of intercalating or deintercalating Li. The Li metal-based alloy may comprise an alloy of Li and at least one selected from Al, Sn, Mg, In, Ca, germanium (Ge), antimony (Sb), bismuth (Bi), and lead (Pb). The negative electrode 210 may effectively determine a capacity of the metal-air battery 10. Alternatively, an aluminum negative electrode may be used. The negative electrode 210 may be provided by disposing, e.g., coating, at least one of the foregoing in the channel 110 of the body 100.

The electrolyte 230 transfers metal ions to the positive electrode 220. In this regard, the electrolyte 230 may include an electrolyte formed by dissolving a metal salt in a solvent. The electrolyte may have a solid phase and may comprise at least one selected from a polymer-based electrolyte, an inorganic electrolyte, and a complex electrolyte including a combination thereof, for example, the metal salt may be a Li salt, such as, $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$, or lithium bis(trifluoromethanesulfonyl)imide ("LiTFSI"), and may additionally include another metal salt, such as at least one selected from $AlCl_3$, $MgCl_2$, NaCl, KCl, NaBr, KBr, and $CaCl_2$ in addition to the lithium salt described above. The solvent may be any suitable material that may dissolve the Li salt or the metal salt described above. The solvent may be a non-aqueous solvent and may comprise at least one selected from a carbonate, an ester, an ether, a ketone, and an alcohol. The carbonate may be linear or cyclic, and may be fluorinated. Representative carbonates include at least one selected from diethyl carbonate ("DEC"), dimethyl carbonate ("DMC"), dipropyl carbonate ("DPC"), methyl propyl carbonate ("MPC"), ethyl propyl carbonate ("EPC"), and methyl ethyl carbonate ("MEC"), and the cyclic carbonate compound may be, for example, ethylene carbonate ("EC"), propylene carbonate ("PC"), butylene carbonate ("BC"), vinyl ethylene carbonate ("VEC"), fluoroethylene carbonate ("FEC"), 4,5-difluoroethylene carbonate, 4,4-difluoroethylene carbonate, 4,4,5-trifluoroethylene carbonate, 4,4,5,5-tetrafluoroethylene carbonate, 4-fluoro-5-methylethylene carbonate, 4-fluoro-4-methylethylene carbonate, 4,5-difluoro-4-methyl ethylene carbonate, 4,4,5-trifluoro-5-methylethylene carbonate, and trifluoromethyl ethylene carbonate. Representative esters include at least one selected from methyl acetate, ethyl acetate, n-propyl acetate, dimethyl acetate, methyl propionate, ethyl propionate, γ-butyrolactone, decanolide, valerolactone, mevalonolactone, caprolactone, and methyl formate. Representative ethers include at least one selected from dibutyl ether, tetraglyme, diglyme, 1,2-dimethoxy ethane, 1,2-diethoxy ethane, ethoxy methoxy ethane, 2-methyl tetrahydrofuran, and tetrahydrofuran. A representative ketone is cyclohexanone. Representative alcohols include methanol, ethanol, isopropanol, and butanol. The solvent may comprise a nitrile, such as a C1 to C20 nitrile; an amide such as formamide or dimethyl formamide; a dioxolane such as 1,2-dioxolane or 1,3-dioxolane; a sulfolane such as dimethyl sulfoxide, sulfolane, or methyl sulfolane; 1,3-dimethyl-2-imidazolinone; N-methyl-2-pyrrolidinone; nitromethane; trimethyl phosphate; triethyl phosphate; trioctyl phosphate; or triester phosphate.

The electrolyte 230 may be disposed on, e.g., coated on, the negative electrode 210. Alternatively, the electrolyte 230 may be separately formed and then attached to the negative electrode 210.

The positive electrode 220 may include an electrolyte for conduction of metal ions, a catalyst for oxidation/reduction of oxygen, a conductive material, and a binder. For example, the electrolyte, the catalyst, the conductive material, and the binder may be combined to provide a first mixture, and then a solvent may be added to the first mixture to prepare a positive electrode slurry. Then, the positive electrode slurry may be disposed on the electrolyte 230 and dried to form the positive electrode 220.

In this regard, the electrolyte may include the lithium salt or the metal salt described above. The conductive material may comprise at least one selected from a porous carbonaceous material, a conductive metal material, and a conductive organic material. For example, the carbonaceous material may comprise at least one selected from carbon black, graphite, graphene, active carbon, carbon fibers, and carbon nanotubes. The conductive metal material may be in the form of a metal powder. The catalyst may comprise at least one selected from platinum (Pt), gold (Au), and silver (Ag), and may comprise at least one selected from an oxide of manganese (Mn), nickel (Ni), and cobalt (Co). Also, the binder may comprise at least one selected from polytetrafluoroethylene ("PTFE"), polypropylene, polyvinylidene fluoride ("PVDF"), polyethylene, and styrene-butadiene rubber. The positive electrode 220 is disposed on, e.g., coated on, the electrolyte 230.

Figure 2B:
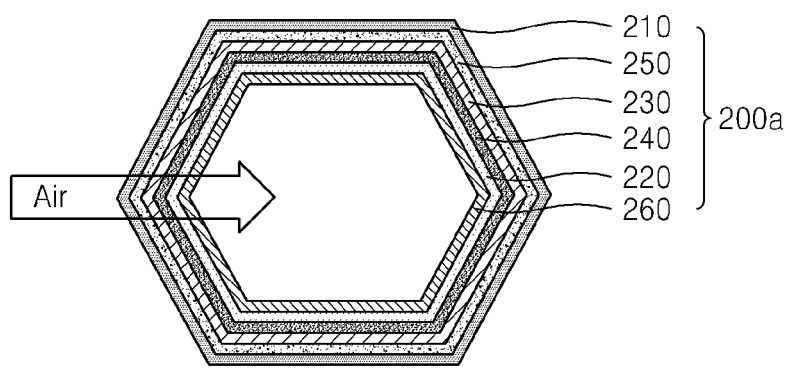
FIG. 2B shows another embodiment of a cell of the metal-air battery shown in FIG. 1.

FIG. 2B shows a cell 200a according to other embodiment. The cell 200a may be applied to the metal-air battery 10 shown in FIG. 1. Compared to the cell 200, the cell 200a in FIG. 2B may further include a protection film 240 that inhibits oxygen permeation towards the negative electrode 210, and an interlayer 250 that facilitates the movement of metal ions, in addition to the negative electrode 210, the positive electrode 220, and the electrolyte 230. Also, the cell 200a may further include a gas diffusion layer 260 that is disposed on the positive electrode 220 and which facilitates supply of oxygen to the positive electrode 220. The negative electrode 210, the electrolyte 230, and the positive electrode 220 shown in FIG. 2B are respectively the same as those shown in FIG. 2A. The cell 200a need not include each of the protection film 240, the interlayer 250, and the gas diffusion layer 260, may include at least one of the protection film 240, the interlayer 250, and the gas diffusion layer 260, or may not include each of the protection film 240, the interlayer 250, and the gas diffusion layer 260.

The protection film 240 may be disposed between the negative electrode 210 and the electrolyte 230, and may inhibit oxygen permeation towards the negative electrode 210. The protection film 240 may comprise a metal ion conductive solid electrolyte film. For example, when the negative electrode 210 includes Li, the metal ion conductive solid electrolyte film may be a Li ion conductive solid electrolyte. The Li ion conductive solid electrolyte film may effectively prevent water in an aqueous electrolyte from directly contacting, e.g., reacting with, Li included in the negative electrode 210. The Li ion conductive solid electrolyte film may comprise at least one selected from a Li ion conductive glass, a Li ion conductive crystalline material, e.g., a lithium conductive ceramic or glass-ceramic, and an inorganic material. The Li ion conductive solid electrolyte film may include an oxide in consideration of chemical stability.

The Li ion conductive crystalline material may comprise at least one selected from $Li_{1+x+y}(Al_aGa_{1-a})_x(Ti_bGe_{1-b})_{2-x}Si_yP_{3-y}O_{12}$ wherein, $0 \le x \le 1$, $0 \le y \le 1$, for example, $0 \le x \le 0.4$, $0 < y \le 0.6$, or $0.1 \le x \le 0.3$, $0.1 < y \le 0.4$, and wherein $0 < a < 1$ and $0 < b < 1$, or $0 \le a \le 1$ and $0 \le b \le 0.6$. Examples of the Li ion conductive glass-ceramic include at least one selected from a Li-aluminum-germanium-phosphate ("LAGP"), a Li-aluminum-titanium-phosphate ("LATP"), and a Li-aluminum-titanium-silicon-phosphate ("LATSP"). The Li ion conductive solid electrolyte film may further include a polymer solid electrolyte, in addition to the glass-ceramic component. The polymer solid electrolyte may comprise a Li salt-doped polyethylene oxide, and examples of the salt include at least one selected from $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, and $LiAlCl_4$.

The interlayer 250 is disposed between the negative electrode 210 and the protection film 240 to facilitate the movement of metal ions. The interlayer 250 may further include at least one selected from a liquid electrolyte including a non-aqueous solvent and a Li salt, an inorganic solid electrolyte film, a polymer solid electrolyte film, and a gel-type polymer electrolyte film. For example, the interlayer 250 may comprise a liquid electrolyte including a non-aqueous solvent and at least one selected from a Li salt, an inorganic solid electrolyte film such as $Cu_3N$, $Li_3N$, and LiPON, and a polymer electrolyte film. The solvent may be as disclosed above.

The protection film 240 and the interlayer 250 may comprise a plurality of layers or may be formed as a single layer of a separation film. The separation film may comprise a polymer non-woven fabric, such as non-woven fabric formed of a polypropylene material or a polyphenylene sulfide material, or a porous film formed of an olefin-based resin such as polyethylene or polypropylene. The separation film and the electrolyte 230 may be separate layers, or the separation film and the electrolyte 230 may be provided as a single layer by impregnating an electrolyte in pores of a porous separation film. For example, an electrolyte comprising a combination of polyethylene oxide ("PEO") and LiTFSI may be impregnated in the holes of the porous separation film to form the electrolyte 230.

The gas diffusion layer 260 may be disposed on the positive electrode 220 to be exposed externally, that is in fluid communication with outside air. The gas diffusion layer 260 may absorb oxygen in the atmosphere and provide the oxygen to the positive electrode 220. In this regard, the gas diffusion layer 260 may have a porous structure for facilitating the diffusion of external oxygen. For example, carbon paper comprising carbon fiber and carbon cloth, carbon felt, or a metal fiber, e.g. in the form of a mat, may be used to form the gas diffusion layer 260.

Figure 3:
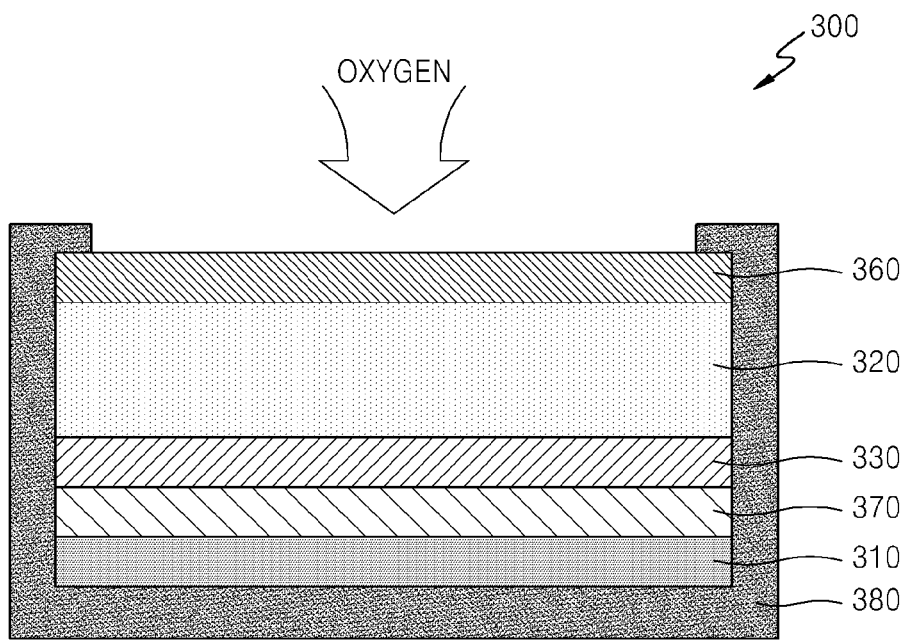
FIG. 3 is a cross-sectional view showing a schematic structure of a metal-air battery having a 2-dimensional flat cell shape according to a Comparative Example.
Figure 4:
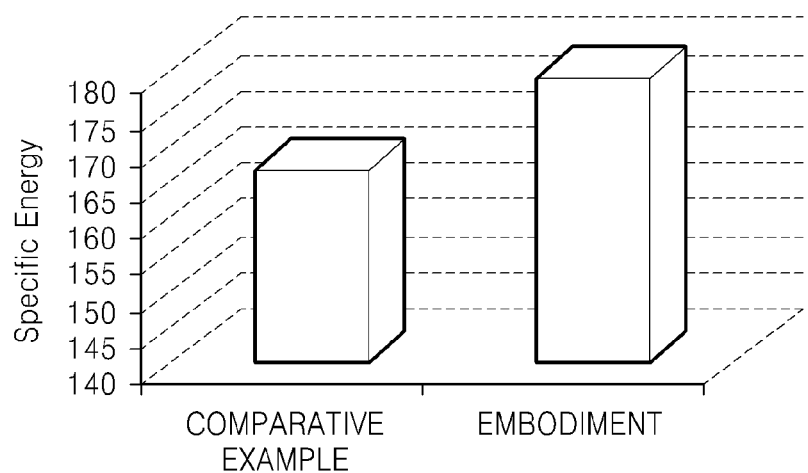
FIG. 4 is a graph of specific energy (Watt-hours per kilogram (Wh/kg)) showing a comparison between a specific energy density of the metal-air battery shown in FIG. 1 ("Embodiment") and a specific energy of the metal-air battery of the Comparative Example.

According to an embodiment, the metal-air battery 10 may include the cell 200 in a single body 100, and thus, a specific energy (Wh/kg) of the metal-air battery 10 may be substantially improved. FIG. 3 is a cross-sectional view showing a schematic structure of a metal-air battery 300 having a two-dimensional ("2D") flat cell shape according to a Comparative Example. FIG. 4 is a graph showing a comparison between a specific energy of the metal-air battery 10 shown in FIG. 1 and a specific energy of the metal-air battery 300 of the Comparative Example. A reactive surface of the metal-air battery 10 according to an embodiment and a reactive surface of the metal-air battery 300 according to the Comparative Example are the same.

Referring to FIG. 3, the cell 300 having a 2D flat cell shape according to the Comparative Example may include a negative electrode 310, a positive electrode 320, a electrolyte 330, a separation film 370 that blocks oxygen and has conductivity for metal ions, and an enclosing member 380 that encloses portions of the metal-air battery other than a top surface of the gas diffusion layer 360. A cell of the metal-air battery 10 according to an embodiment has the same cell materials as those of the Comparative Example. In the case of the cell 300 having a 2D flat cell shape, when a plurality of cells are vertically stacked, oxygen supply to the cells at the bottom may be impeded. Alternatively, in the case of the metal-air battery 10 according to an embodiment, the positive electrode 220 in each cell 200 is exposed to the channel 110, and thus, oxygen supply thereto may be facilitated. Referring to the graph in FIG. 4, it may be concluded that the specific energy of the metal-air battery 10 having a honeycomb structure is better than the specific energy of the cell 300 according to the Comparative Example.

Figure 5A:
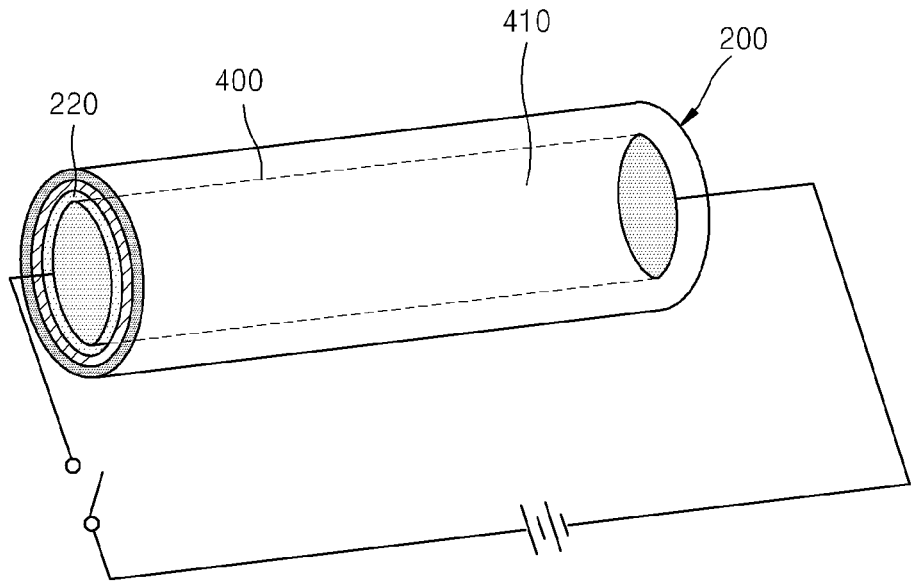
FIGS. 5A and 5B show portions of another embodiment of a metal-air battery.
Figure 5B:
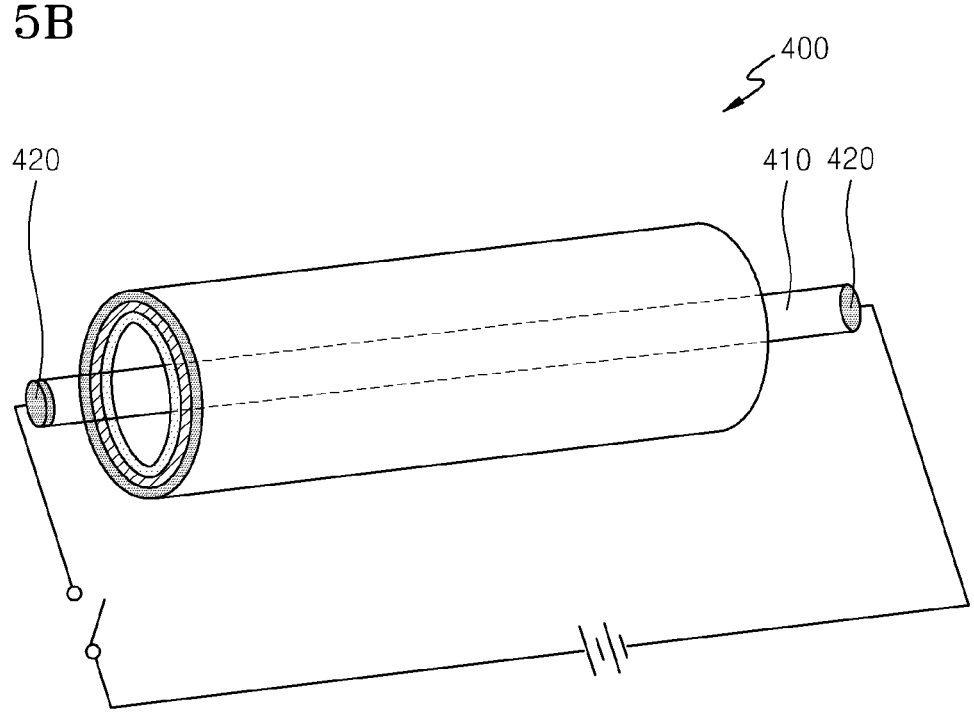

FIGS. 5A and 5B show portions of the metal-air battery 10 according to another embodiment. As shown in FIGS. 5A and 5B, the metal-air battery 10 may further include a pressing unit 400 that is disposed in the channel 100 and applies a pressure in a direction, e.g., a radial direction, from the channel 110 to the body 100. In a battery comprising a plurality of cells, the pressing unit 400 may be disposed in each channel 110 or may be disposed in some channels 110. When the metal-air battery 10 is charged or discharged, the cell 200 may be separated from the body 100 due to volumetric changes of the cell 200. As such, a means for immobilizing the cell 200 to the body 100 may be desired. The pressing unit 400 may apply a pressure to the cell 200 in the channel 110 towards the body 100 to immobilize the cell 200 to the body 100.

A shape of the pressing unit 400 may change according to a voltage applied thereto. For example, when no voltage is applied to the pressing unit 400, the pressing unit 400 may be disposed apart from the cell 200. Accordingly, the positive electrode 220 in the cell 200 may be exposed to air. When a voltage is applied to the pressing unit 400, the shape of the pressuring unit 400 increases in size from the central axis of the channel 110 to the body 100, to thereby immobilize the cell 200 to the body 100. When the cell 200 is not charging or discharging, the pressing unit 400 may press the cell 200.

The pressing unit 400 may include an elastic member 410, a shape of which changes according to the applied voltage, and a pair of electrodes 420 that are disposed on or separated from the elastic member 410. The pair of electrodes 420 applies a voltage to the elastic member 410. The elastic member 410 may comprise a material having suitable elasticity. For example, the elastic member 410 may include at least one selected from silicon, polysiloxane, polyurethane, polysilicon-polyurethane, rubber, ethylene-vinyl acetate copolymer, phenolic nitrile rubber, styrene butadiene rubber, polyether-block-amide, and polyolefin, and may comprise a gels and other suitable material.

The pair of electrodes 420 may be respectively disposed on top and bottom of the elastic member 410 with the elastic member 410 disposed therebetween. Each of the pair of electrodes 420 may be formed as a thin film. When the elastic member 410 and the pair of electrodes 420 have a sandwich structure as illustrated in FIG. 5A, the elastic member 410 may expand in a lateral direction of the body 100 according to the voltage applied, to thereby attach the cell 200 to the body 100. Also, when no voltage is applied, as illustrated in FIG. 5B, the elastic member 410 may shrink in the lateral direction of the body 100, and thus, the elastic member 410 may be separated from the cell 200.

Figure 6A:
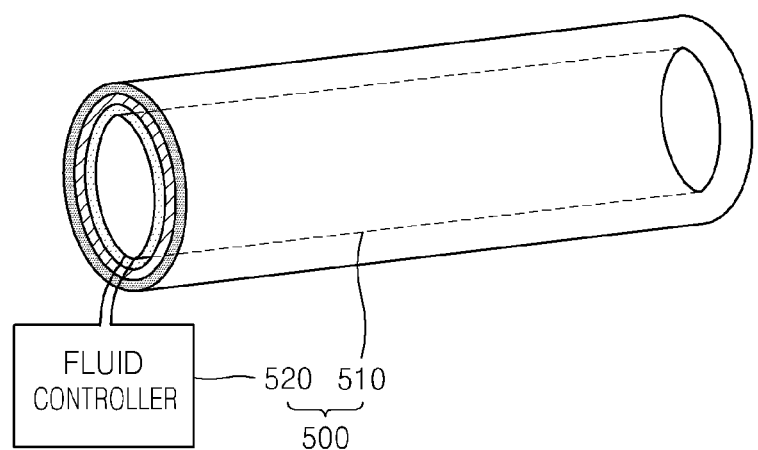
FIGS. 6A and 6B show an example of an embodiment of a pressing unit that may be disposed in a metal-air battery.
Figure 6B:
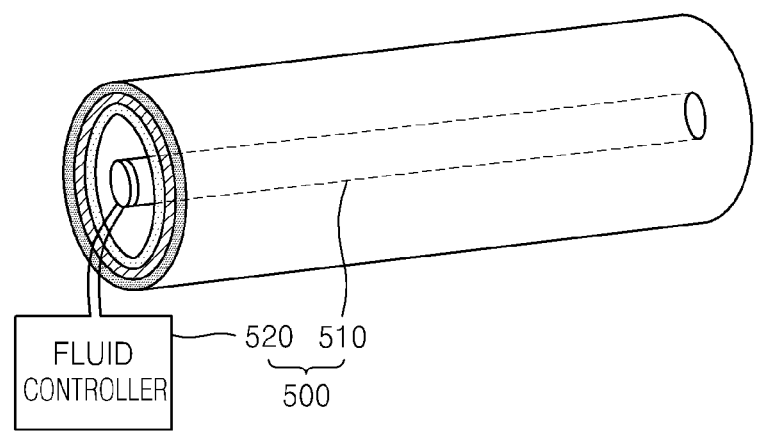

FIGS. 6A and 6B show other example of a pressing unit 500 that may be applied to a metal-air battery according to an embodiment. As shown in FIGS. 6A and 6B, the pressing unit 500 may include an elastic member 510, a shape of which changes according to the pressure of a fluid, and a fluid controller 520 providing a fluid to the elastic member 510. The elastic member 510 has a space in which the fluid may flow, and one end of the elastic member 510 may be connected to the fluid controller 520 and other end of the elastic member 510 may be closed. The elastic member 510 may be a hollow fiber shape. When the fluid controller 520 provides the fluid to the space in the elastic member 510, the elastic member 510 may expand and thus presses the cell 200, as illustrated in FIG. 6A. Also, when the fluid controller 520 absorbs the fluid in the elastic member 510, the elastic member 510 may shrink and return to its original shape, as illustrated in FIG. 6B.

Figure 7:
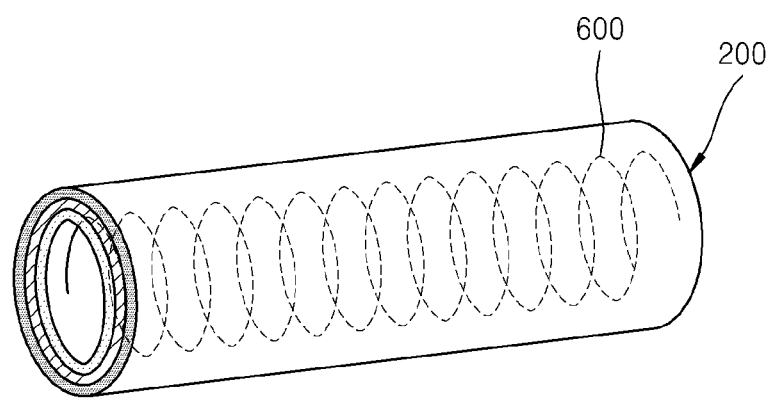
FIG. 7 is a drawing showing another embodiment of a pressing unit that may be disposed in a metal-air battery.
Figure 8:
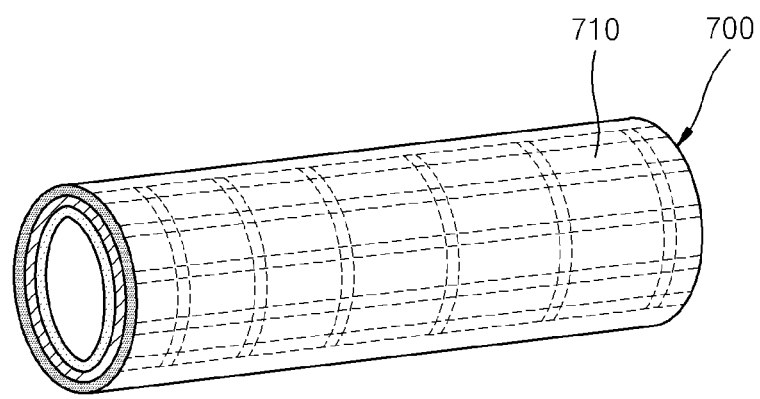
FIG. 8 is a drawing showing yet another embodiment of a pressing unit that may be disposed in a metal-air battery.

FIGS. 7 and 8 are drawings showing other embodiment of a pressing unit 600 and 700, respectively, that may be applied to a metal-air battery according to an embodiment. As illustrated in FIG. 7, the pressing unit 600 may have a spring shape. The pressing unit 600 having a spring shape may simultaneously press the cell 200 and externally expose the positive electrode 220. Also, the pressing unit 600 having a spring shape may absorb volumetric changes of the cell 200 during charging and discharging thereof to maintain the external shape of the metal-air battery. Also, the pressing unit 400 may include a conductive material to act as a current collector.

Alternatively, as illustrated in FIG. 8, the pressing unit 700 may have elastic hollow fiber shape and a side of the pressing unit 700 may be formed as a net, a mesh shape, or the like having holes 710 to externally expose the positive electrode. As such, the pressing unit 700 may simultaneously externally expose the positive electrode and apply a pressure to the cell 200. Also, the pressing unit 700 in FIG. 8 may include a conductive material to act as a current collector.

The pressing units 400 to 700 disclosed above are just examples and the pressing units 400 to 700 may be formed to have other shapes and configurations as long as they are capable of pressing the cell 200. Also, at least some portions of the pressing units 400 to 700 may include conductive materials to act as current collectors.

As described above, according to the one or more of the above embodiments, a metal-air battery may have improved specific energy and maintain its external shape by using a pressing unit.

Hereinbefore, exemplary embodiments of a metal-air battery having a honeycomb structure and a method of manufacturing the metal-air battery have been described and shown in the enclosed drawings for ease of understanding.

It should be understood that the exemplary embodiments described herein should be considered in a descriptive sense only and not for purposes of limitation. Descriptions of features, advantages and aspects within each embodiment should be considered as available for other similar features, advantages and aspects in other embodiments.

While one or more embodiments have been described with reference to the figures, it will be understood by those of ordinary skill in the art that various changes in form and details may be made therein without departing from the spirit and scope disclosure as defined by the following claims.

What is claimed is:

1. A metal-air battery comprising:
    a monolithic body comprising a plurality of channels and formed of at least one of a ceramic and a metal; and
    a plurality of cells disposed between the channel and the body, a cell of the plurality of cells comprising
        a negative electrode comprising a metal,
        a positive electrode disposed apart from the negative electrode and configured to use oxygen as an active material, and
        an electrolyte disposed between the negative electrode and the positive electrode.

2. The metal-air battery of claim 1, wherein a channel of the plurality of channels passes through the body and is disposed in a direction which is parallel to a length direction of the body.

3. The metal-air battery of claim 1, wherein the at least one cell of the plurality of cells has hexagonal symmetry.

4. The metal-air battery of claim 3, further comprising a wall of the body between adjacent cells of the plurality of cells.

5. The metal-air battery of claim 1, wherein the positive electrode is in fluid communication with the channel.

6. The metal-air battery of claim 1, wherein the negative electrode contacts an inner surface of the body.

7. The metal-air battery of claim 1, wherein at least one of the negative electrode, the positive electrode, and the electrolyte is symmetrical with respect to a central axis of a channel of the plurality of channels.

8. The metal-air battery of claim 1, wherein the negative electrode comprises at least one selected from lithium metal, a lithium metal alloy, and a lithium intercalation compound.

9. The metal-air battery of claim 1, wherein a cell of the plurality of cells further comprises at least one selected from a protection film that is disposed between the negative electrode and the electrolyte and which is configured to inhibit oxygen permeation towards the negative electrode; and
    an interlayer that is disposed between the negative electrode and the electrolyte and which is configured to facilitate movement of metal ions.

10. The metal-air battery of claim 1, wherein a cell of the plurality of cells further comprises a gas diffusion layer that is disposed on the positive electrode and which is configured to facilitate a supply of oxygen to the positive electrode.

11. The metal-air battery of claim 1, further comprising a carbon layer on an external surface of the body.

12. The metal-air battery of claim 1, further comprising a pressing unit that is configured to apply a pressure in a direction from a channel of the a plurality of channels to the body.

13. The metal-air battery of claim 12, wherein the pressing unit is disposed in channel the plurality of channels.

14. The metal-air battery of claim 12, wherein a shape of the pressing unit changes according to a voltage applied thereto.

15. The metal-air battery of claim 13, wherein the pressing unit expands in a direction from a central axis of the channel to the body when a voltage is applied thereto and is disposed apart from the cell when no voltage is applied thereto.

16. The metal-air battery of claim 12, wherein the pressing unit comprises an elastic member having a shape which is responsive to a voltage applied thereto; and
    a pair of electrodes that are disposed apart from each other with the elastic member disposed therebetween and that apply the voltage to the elastic member.

17. The metal-air battery of claim 12, wherein the pressing unit comprises an elastic member having a shape which is responsive to inflow of a fluid; and
    a fluid controller providing the fluid into the elastic member.

18. The metal-air battery of claim 17, wherein the elastic member has a hollow fiber shape.

19. The metal-air battery of claim 18, wherein an end of the elastic member is connected to the fluid controller and other end of the elastic member is closed.

20. The metal-air battery of claim 12, wherein the pressing unit has a spring shape.

21. The metal-air battery of claim 12, wherein the pressing unit has a hollow fiber shape having an empty interior, binds to the cell, and comprises a side having holes formed therein.

22. The metal-air battery of claim 12, wherein the pressing unit comprises a conductive material.

* * * * *